United States Patent
Burke

(10) Patent No.: US 7,127,118 B2
(45) Date of Patent: Oct. 24, 2006

(54) SYSTEM AND METHOD FOR COMPRESSING IMAGE FILES WHILE PRESERVING VISUALLY SIGNIFICANT ASPECTS

(76) Inventor: Gregory Michael Burke, c/o Visible Limit Incorporated 315 Coast Highway 101, Suite U, Encinitas, CA (US) 92014-0378

(*) Notice: Subject to any disclaimer, the term of this patent is extended or adjusted under 35 U.S.C. 154(b) by 711 days.

(21) Appl. No.: 10/260,931

(22) Filed: Sep. 27, 2002

(65) Prior Publication Data

US 2003/0063812 A1    Apr. 3, 2003

Related U.S. Application Data

(60) Provisional application No. 60/326,131, filed on Sep. 28, 2001.

(51) Int. Cl.
*G06K 9/36*    (2006.01)
*G06K 9/48*    (2006.01)

(52) U.S. Cl. .................. 382/242; 382/243; 382/166; 345/441

(58) Field of Classification Search ........ 382/241–243, 382/232, 233, 236, 248, 250, 251, 166, 162; 345/419, 17, 23, 24, 25, 26, 441
See application file for complete search history.

(56) References Cited

U.S. PATENT DOCUMENTS

| | | | | |
|---|---|---|---|---|
| 5,457,754 A * | 10/1995 | Han et al. | .................. | 382/128 |
| 5,694,331 A * | 12/1997 | Yamamoto et al. | ......... | 345/428 |
| 5,719,947 A * | 2/1998 | Enomoto et al. | ........... | 382/107 |
| 6,690,827 B1 * | 2/2004 | Horikawa et al. | .......... | 382/203 |
| 2001/0024516 A1 * | 9/2001 | Yoshioka et al. | ........... | 382/128 |

* cited by examiner

*Primary Examiner*—Jingge Wu
*Assistant Examiner*—Ali Bayat
(74) *Attorney, Agent, or Firm*—William C. Fuess

(57) ABSTRACT

The present invention concerns a way of compressing an initial data structure that defines an image as an array of pixel elements. The method includes generating a new data structure that defines contours at least some of which are contours having a constant color value to within a tolerance.

49 Claims, 8 Drawing Sheets

Converting From Pixel Map to Contour Points

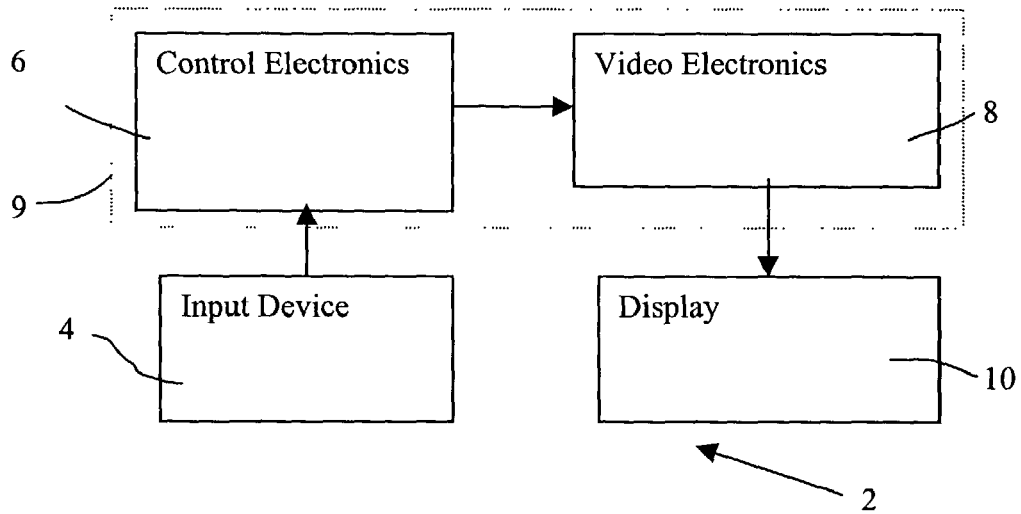
FIG. 1 – BASIC SYSTEM BLOCK DIAGRAM
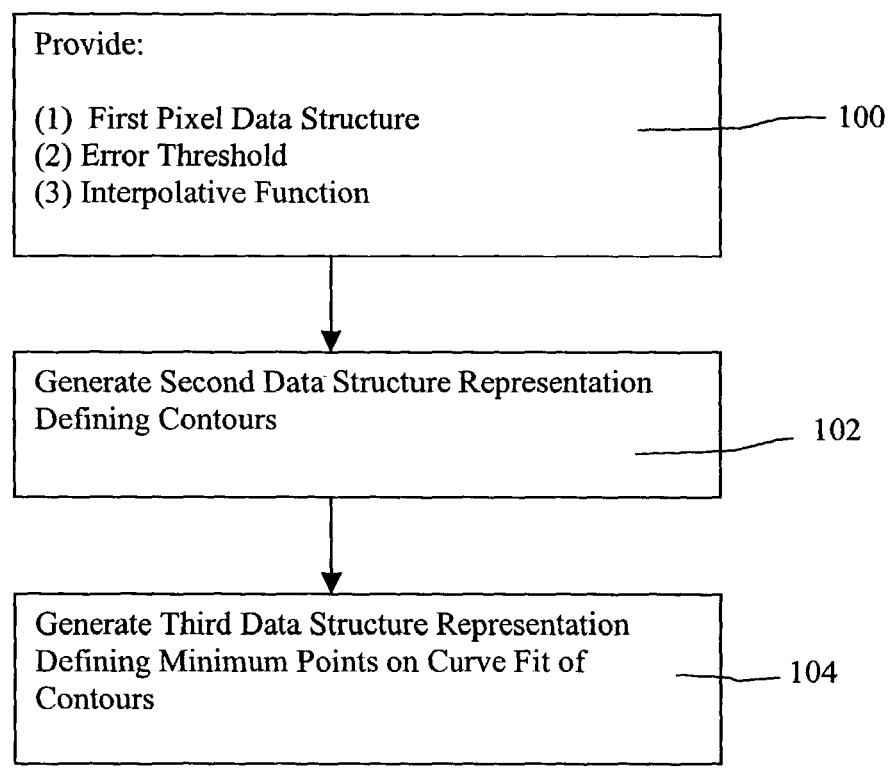
FIG. 2 – DATA COMPRESSION

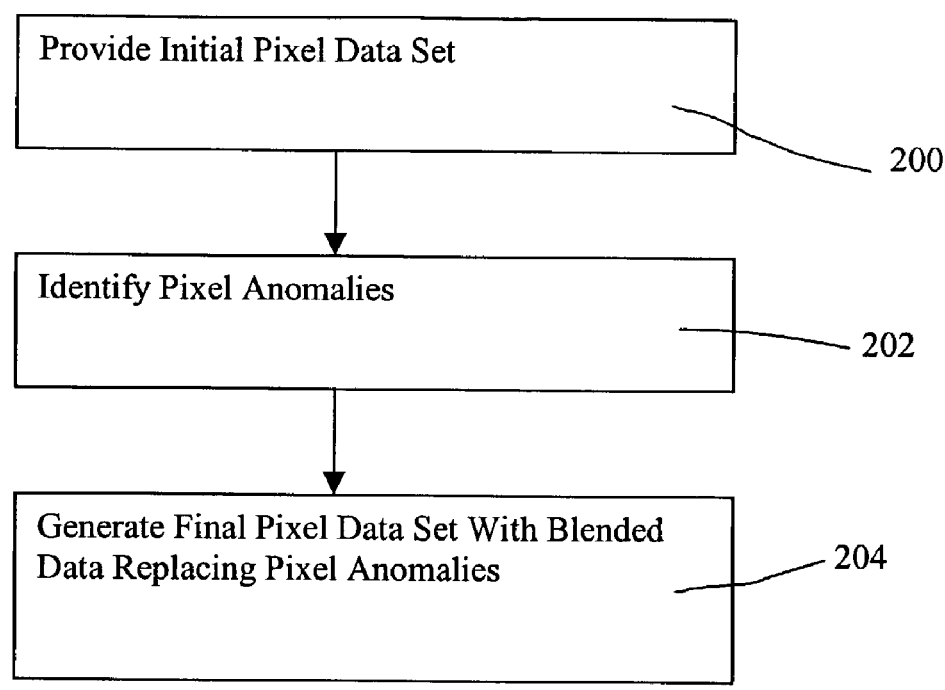
FIG. 3 – Initial Pixel Blending Process

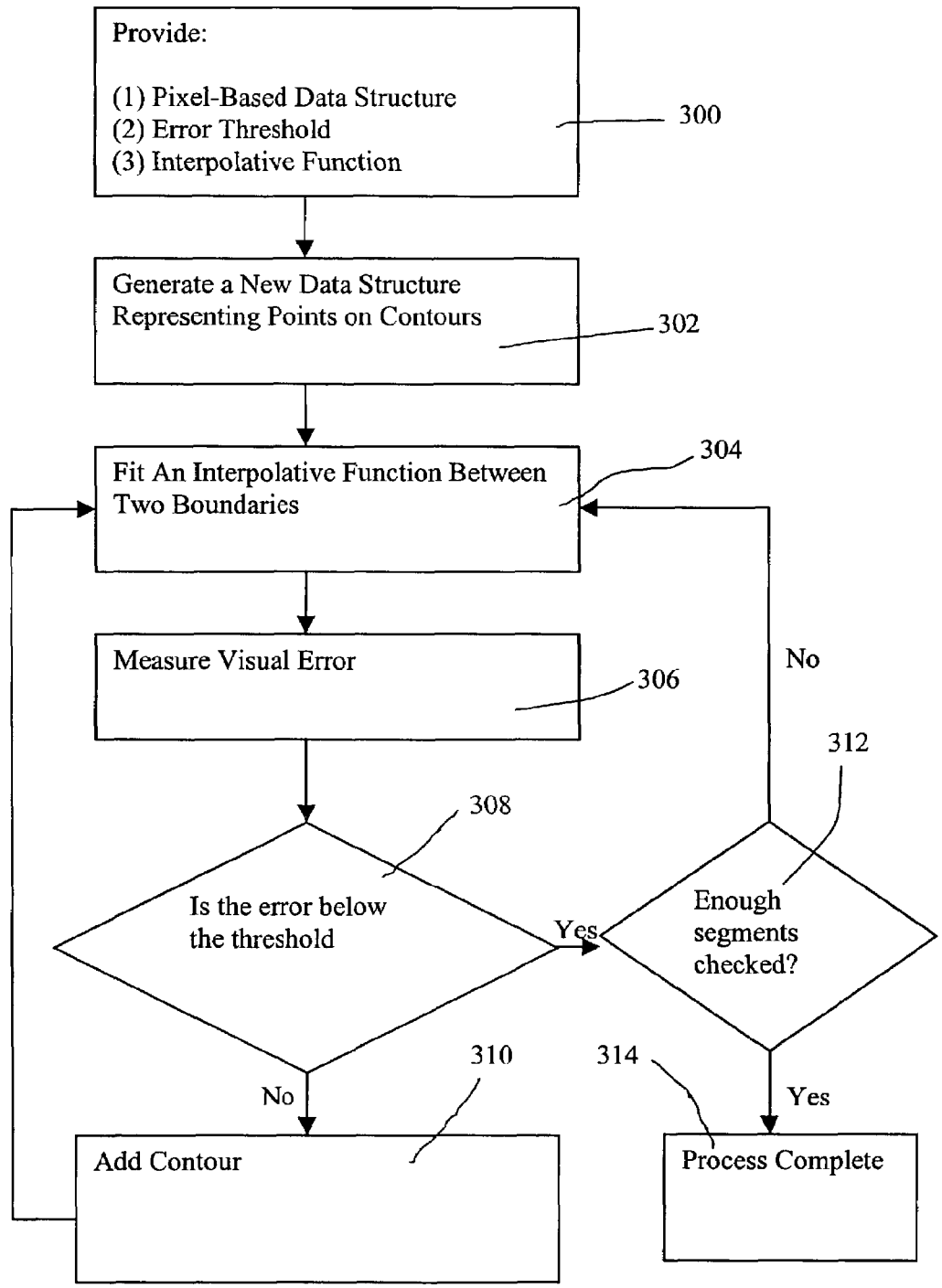
FIG. 4A – Converting From Pixel Map to Contour Points

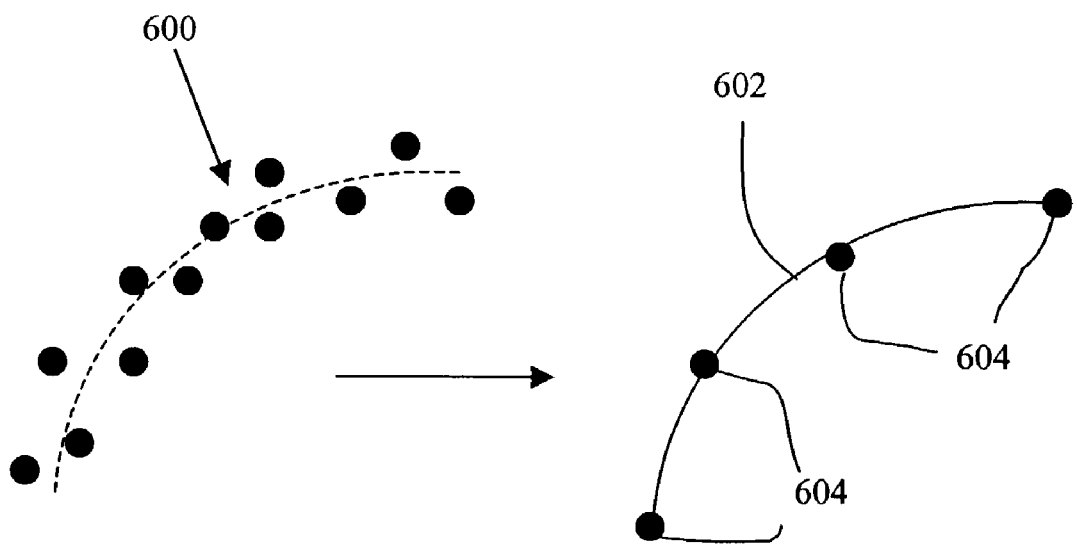
FIG. 5B
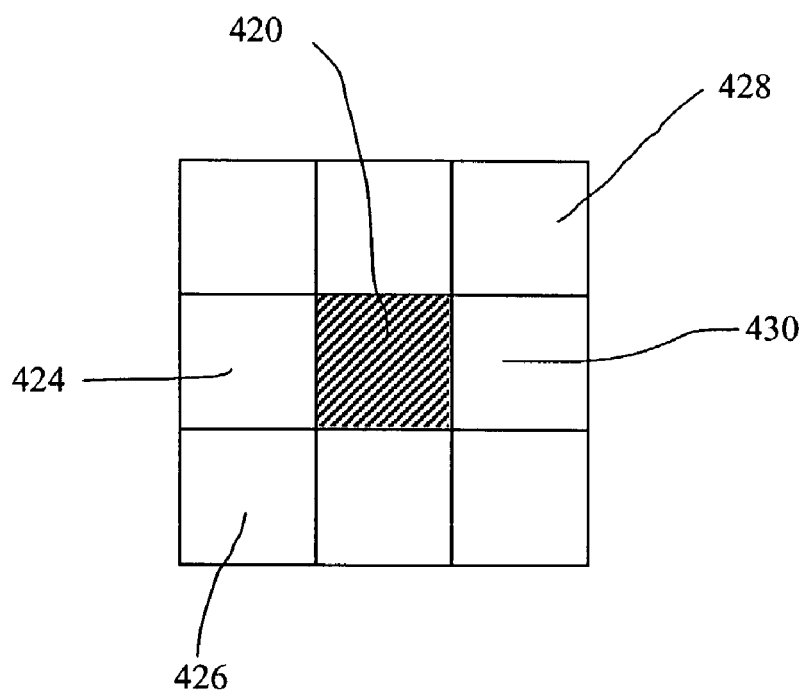
FIG. 4F – Pixel Interpolation

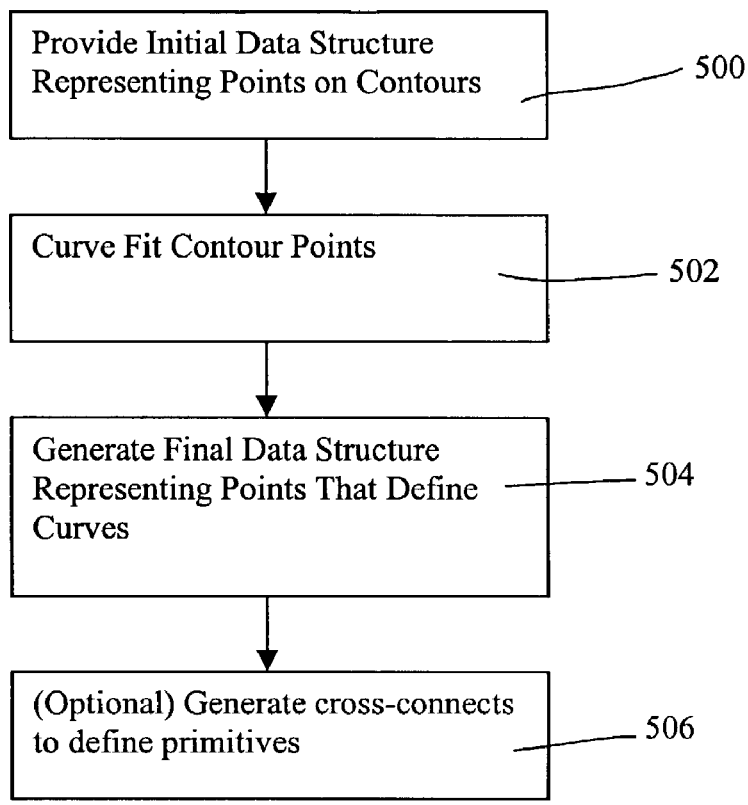
FIG. 5A – Compressing and Cleaning Contour Data
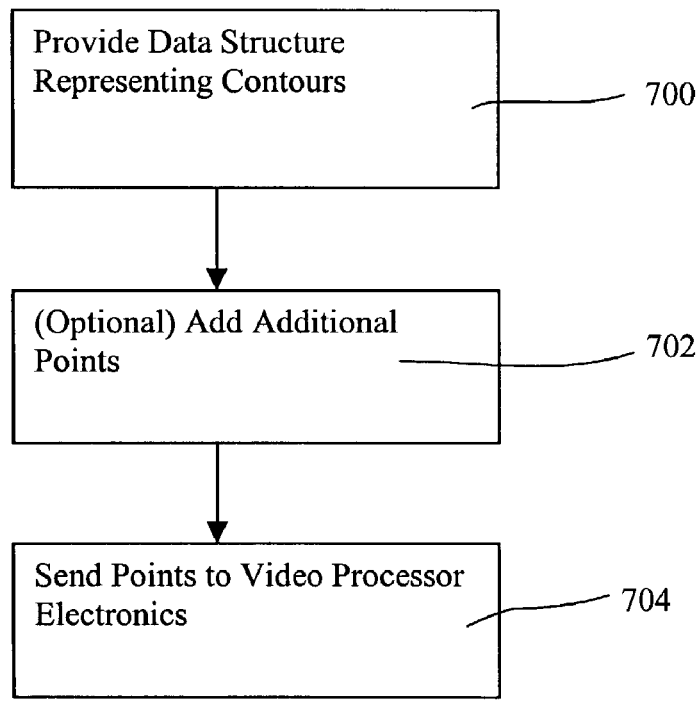
FIG 6A -- Rendering

SYSTEM AND METHOD FOR COMPRESSING IMAGE FILES WHILE PRESERVING VISUALLY SIGNIFICANT ASPECTS

RELATION TO A PROVISIONAL PATENT APPLICATION

The present patent application is descended from, and claims benefit of priority of, U.S. provisional patent application Ser. No. 60/326,131 filed on Sep. 28, 2001, having the same title, and to the selfsame inventor, as the present patent application.

RELATION TO RELATED PATENT APPLICATIONS

The present patent application is related to U.S. patent application Ser. No. 10/219,953 filed on Aug. 14, 2002, for a SYSTEM AND METHOD FOR EFFICIENTLY CREATING A SURFACE MAP, and also to a U.S. patent application filed on an even date here SYSTEM AND METHOD FOR COMPRESSING IMAGE FILES WHILE IMPROVING 3D DATA STRUCTURE REPRESENTATIONS. Both related applications are to the same inventor as is the present application. The contents of the related patent applications are incorporated herein by reference.

BACKGROUND OF THE INVENTION

1. Field of the Invention

The present invention relates to image data compression. More specifically, the present invention relates to a technique of compressing image data and generating a new data structure that preferentially retains and enhances image data information important to human perception.

2. Description of Background Art

The storage and retrieval of digital image files is widespread. It finds applications in digital cameras, computer animations, etc. One challenge is file size and data transfer rates. As images have met and exceeded photo quality thresholds, the resultant image files have become large. This is most noticeable for someone with a slow connection to the internet who must download a long image based document such as a PDF document or an image file.

This is because the files are typically stored in pixel form, wherein each location or pixel on an image is stored as a five or more dimensional data point, including location (x, y, and perhaps z) and color (RGB). There are various compression techniques that deal with such images, but issues include reduction in image quality.

For example, two of the industry standard compression methods, JPEG and MPEG, have issues with level of compression and scaling. For example, when a photograph is compressed with JPEG, it tends to render a very good image below a certain zoom factor. When it is enlarged beyond a certain point, however, "stairstep" artifacts in the image begin to occur.

What is needed is a fast compression and rendering technique that preserves the visually important information for an image at varying zoom factors while providing a drastic decrease in required memory and processing requirements for storing, displaying, transmitting, zooming, and rotating an image.

SUMMARY OF THE INVENTION

The present invention concerns a way of compressing an initial data structure that defines an image as an array of pixel elements. The method includes generating a new data structure that defines contours at least some of which are contours having a constant color value to within a tolerance.

In one preferred embodiment, an error threshold is provided. Additional information is added to the data structure defining additional contours. This is done until an interpolative error between two of the contours is below the error threshold.

BRIEF DESCRIPTION OF THE DRAWINGS

FIG. 1 is a block diagram depicting an image generating system of the present invention.

FIG. 2 is a flow chart representation of the method of the present invention.

FIG. 3 is a flow chart depicting a "stray pixel" replacement process.

FIG. 4A is a flow chart representation of the process 102 from FIG. 2 where an initial pixel-based data structure is converted to a contour-based data structure.

FIG. 4B-1 is a graphical representation of a pixel-based representation of an image.

FIG. 4B-2 is a graphical representation of part of a contour-based representation of the image depicted in FIG. 4B-1.

FIG. 4F is a schematic representation of the neighboring pixels surrounding a pixel location 420.

FIG. 5A is a flow chart depicting a preferred embodiment of process 104 of FIG. 2.

FIG. 5B is a graphical representation of the conversion from a large number of points representing a segment of a contour to the minimum number of points required to curve fit the contour.

FIG. 6A is a flow chart depicting the rendering process.

DESCRIPTION OF A PREFERRED EMBODIMENT OF THE INVENTION

Figures 1, 4B:
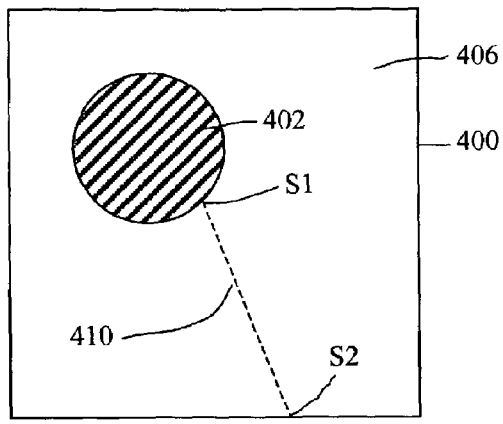

A preferred embodiment of the present invention is now described with reference to the Figures. Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, usually coupled to a computer system bus. Furthermore, the computers referred to in the specification may include a single processor or may be architectures employing multiple processors or other designs for increased computing capability.

The algorithms and displays presented herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

It is also noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

FIG. 1 depicts a block diagram of a system such as an image processing and/or display system 2 incorporating the present invention. System 2 includes a user activated input device 4, such as a keyboard, joystick, mouse, buttons, touch screen (that is activated by touching the screen), electronic pen (that interacts with a display), etc. The input device is coupled to control electronics 6, that typically include a processor and information storage device(s), such as RAM, CD-ROM, etc. The control electronics are in turned coupled to video electronics 8, such as a video processor board. Together, the control electronics and video electronics can be thought of a "video processing system" 9. This is because some systems may integrate the functions of elements 6 and 8 into one board or processor 9. Various systems may perform some functions in software in control electronics 6 or in hardware in video electronics 8. Finally, the video electronics 8 are coupled to and drive a display 10, such as a CRT, flat panel display, or a projector.

The user provides inputs to the control electronics 6 via the input device 4. In response, the control electronics 6 generates and modifies a data structure stored in the control electronics 6. The control electronics 6 generates point data from the data structure and sends the point data to the video electronics 8. The video electronics 8 in turn utilizes the point data to generate a graphical output representation of a 3D object on the display 10. An exemplary system 2 would be a system for viewing images such as photos, wherein the user uses the input device 4 to select photos to be viewed on the display 10. Keep in mind that the functions of the control electronics can be interchanged. For example, processing of points to determine an image representation can go on in one or both of elements 6 and 8. Depending on speed requirements, some processing can be done by software in control electronics 6 or by hardware in video electronics 8 without departing from the scope of the present invention.

Exemplary systems that may incorporate the methods and/or apparatus of the present invention include digital cameras, digital camcorders, or networks that transmit and receive video and still images.

The present invention concerns a method of compressing and enhancing image data by converting from a less optimal pixel based data structure to a new and more optimal contour-based data structure. The contour-based data structure is more compact while preserving the information most important to the human vision system. Further, this new data structure allows for zooming in on images that avoids the loss in image quality that occurs with conventional data structures. Finally, this new data structure enables high speed decoding using standard video cards that utilize Gouraud shaded triangles as output. Thus, this invention represents a significant advance over prior art data structures while providing compatibility with the existing hardware infrastructure.

Figures 2, 4B:
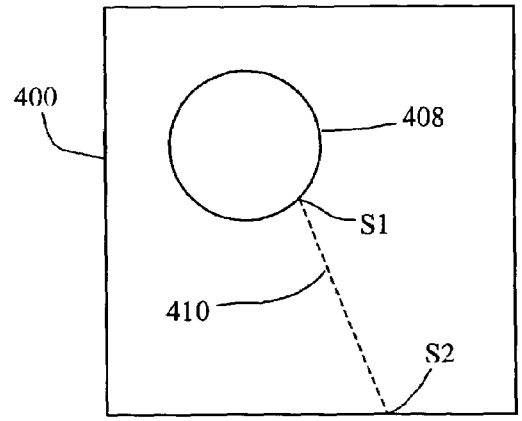

The following detailed description is organized in order of increasing levels of detail. First, the overall process of the present invention will be described at a high level with respect to FIG. 2. Each block in FIG. 2 is a "process" in and of itself. Each of these blocks or processes are then described in more detail with respect to FIGS. 3–5. For example, process 102 of FIG. 2 has enough complexity to require the flow chart of FIG. 4A along with further details with respect to FIGS. 4B–4F.

FIG. 2 is a flow chart depicting a preferred overall method of the present invention. According to process 100, a first pixel data structure is initially provided, along with an error threshold and an interpolative function. The first pixel data structure represents the image as points. In one embodiment, each point has position and color coordinates that are stored in the pixel data structure, such as (x, y, R, G, B), wherein:
x=First rectangular coordinate of the pixel
y=Second rectangular coordinate of the pixel
R, G, B=Red, Green, and Blue Values for the Pixel Of course, other systems are possible. For example, the positional coordinates could be polar coordinates. The color coordinates could be something else, such as luminance and chrominance. In the discussion that follows, reference is made to "color value". In general, this could indicate any single color parameter that can be measured or calculated, such as red, green, blue, cyan, yellow magenta, luminance, chrominance, etc., or any combination thereof.

In a preferred embodiment of process 100, the present invention converts the color coordinates of R, G, and B to Y, Cb, Cr, where:
Y=Luminance
Cb, Cr are components of Chrominance The error threshold is an important aspect of the method of FIG. 2. This is preferably a visible limit threshold, wherein errors above this threshold would be apparent to the human vision system. This threshold, which is described in greater detail below, can be tuned to achieve a desired quality for renderings from the compressed data structure of the present invention.

The interpolative function is a function used to interpolate between image boundaries. Preferably, this function is chosen to be consistent with standard video processing electronics. In an exemplary embodiment, this interpolative function is linear.

According to process 102, the pixel data is processed to define a new, more efficient data structure based on contours. In a preferred embodiment, the new data structure at least partially defines the image in terms of points on color contours each having a constant color value to within a tolerance. Preferably along each color contour, red, green, and blue (or Y, Cb, and Cr—luminance and chrominance) are constant to within a specified overall tolerance. The number or density of contours is the minimum number or density required to provide an interpolative fit between contours that keeps the error in representing the original image below the error threshold. Additional contours may be defined that allow for other aspects of the image to be represented, including geometric features or texture.

To improve things further, according to process 104, the contours are made smoother and the number of points required to represent them is reduced. This is done by fitting curves or splines along the contours. Finally a data set is generated that represents the minimum number of points along each curve that define the splines—these "control points" fall on and at the ends of the splines.

Although processes 102 and 104 are represented separately in FIG. 2, it is to be understood that they can be performed either in sequence or simultaneously. For example, each time points on a contour is generated according to the method of process 102, the final data structure points can then be generated for that contour, before generating the next contour. Alternatively, all of the pixel points defining the contours can be generated before turning to process 104. Both of these alternative methods fall within the scope of the present invention and both generate a data structure within the scope of the present invention.

FIG. 3 is a flow chart depicting a preferred method that is utilized prior to process 102 of FIG. 2. The purpose of this method is to improve the efficiency of subsequent processes by eliminating data that will not provide a better image representation. In step 200, initial pixel data is provided, such as a bitmap file from a digital camera or a scanner. The bitmap file is a multiplicity of data elements, with each data element representing a pixel of an image. Very often, there are anomalous or "stray" pixels that do not add any information discernable by the human eye. These pixels have a color that is substantially different than those surrounding them.

These stray pixels are identified in step 202. This can be done by comparing each pixel element color with the average color of pixels surrounding the pixel. When the difference is above a predetermined threshold or tolerance, then the pixel is a "stray" pixel. In one embodiment, the stray pixels are replaced in step 204 wherein the color of the stray pixel is replaced with the average color of some or all surrounding pixels. In another embodiment of step 204, a smooth linear or non-linear fit of the color versus location is generated to replace a group of pixels.

In a preferred embodiment, after removing stray pixels, the color space is converted from RGB (red, green, blue) to Y, Cb, Cr (luminence and chrominance). Methods for converting between different color spaces are known in the art.

Turning to FIG. 4a, a flow chart depicts a preferred embodiment of process 102 from FIG. 2. The purpose of process 102 is to replace a pixel-based data structure with a contour-based data structure that is more optimized for the human vision system. In step 300, a pixel based data structure is provided. Preferably, this data structure has been "cleaned" to eliminate stray pixels according to the method of FIG. 3a. Also provided in step 300 is an error threshold and an interpolative function. The error threshold is related to an interpolative error calculation and is preferably close to the visible limit for the human vision system.

According to step 302, a new data structure is generated defining points on contours that are either boundaries of objects, contours of least color change, or contours having color values that are maxima or minima. In low density regions of an image such as smooth, curved surfaces, the contours are substantially constant color contours. In high density regions of an image such as hair or grass, the contours follow peaks or values of the color surface. This minimizes the amount of data required to encode control points that define the contours.

For many images or regions of images, the data structure defines points that are on contours of (substantially) constant color, which means that the color along a contour is within some predetermined limits. Stated another way, each point on the contour has a "color difference" (one version of this defined below as DC) relative to an average or defined color of the contour that is below a tolerance.

To explain this process further, some definitions are set forth:
DC=Delta Color, or the "color difference"
DY=Difference in Luminance
DCb=Difference in value for Cb
DCr=Difference in value for Cr
DC=sqrt($DY^2+DCb^2+DCr^2$), where:
sqrt( )=the square root of the quantity in brackets
$DY^2$=the square of DY $DCb^2$=the square of DCb
$DCr^2$=the square of DCr For points included on a contour having a substantially constant color value the values are:

DY=Y(contour)−Y(point), where Y(contour) is the average or assigned luminance for the contour and Y(point) is the luminance value for the particular point Similar definitions hold for Cb and Cr. Now for the contour, the present invention keeps the value for DC for each point included on the contour below a certain error threshold value.

In a preferred embodiment of step 302, the original pixel map defined by the pixel-based data structure is initially scanned to find regions in x and y of substantially constant color. These regions are then represented in the new data structure as points forming closed color contours that surround the regions of constant color.

This preferred embodiment of step 302 is depicted with respect to FIGS. 4b-1 (old data structure pixel array) and 4b-2 (new data structure contour map). The old data structure stores a 5 (or more) dimensional value for each pixel. As indicated before, each point on the image would have a value of x, y, Y, Cb, Cr. Other factors may also be stored, such as opacity and texture, but for ease of discussion, the example will be a five dimension system recognizing that other dimensions may be stored for each point. The points represent the original image depicted in 4b-1, that includes a border 400, a region of constant color 402, and a region of varying color 406.

To begin with, the pixel array of 4b-1 is scanned (by analyzing the 5 dimensional pixel data) and the region 402 is identified (as a region where the color is the same to within a predetermined tolerance, wherein one method of calculating it is defined above). A new data structure is then generated that includes data representations of points on the border 400 of the pixel array. The new data structure also includes a set of points defining a closed contour 408 that enclose the region of constant color. The Y, Cb, and Cr values for each point on the contour 408 are the same as the Y, Cb, and Cr values for the region 402 (again to within some predetermined limit or tolerance).

In a preferred embodiment process 104 of FIG. 2 is then invoked. Each time a contour is formed, an optimized curve or spline is fitted through portions of each contour. The data structure is then modified to only include the minimum number of points that are referred to as control points required to plot the resultant splines. This results in another compression of the data, since only the control points of the curves or splines will be stored in the data structure. A preferred embodiment of this process will be discussed later with respect to FIG. 5. However, before that discussion will be a discussion about step 304 of FIG. 4a.

At this point, an interpolative fit is carried out between two image boundaries according to step 304 of FIG. 4a. An image boundary is defined by a contour (such as 408 in FIG. 4b-2) or the border (such as 400 of FIG. 4b-1) of the contour map. In an exemplary embodiment, this is done by comparing a plot of color versus position between two points on the original pixel array with a linear fit between the same two boundaries on the contour map. This is done for Y, Cb, and Cr.

In a preferred embodiment, this is done by "plotting" color versus position along a line that is perpendicular to a contour of constant color, since that is the direction of maximum change (the gradient) for the color and hence the most efficient way to identify color change. A conceptual example of this is segment 410 from FIGS. 4b-1 (defined by the old pixel-based data structure) and 4b-2 (defined by new contour-based data structure). This step optimizes the placement and number of contours for further compression.

Figure 4C:
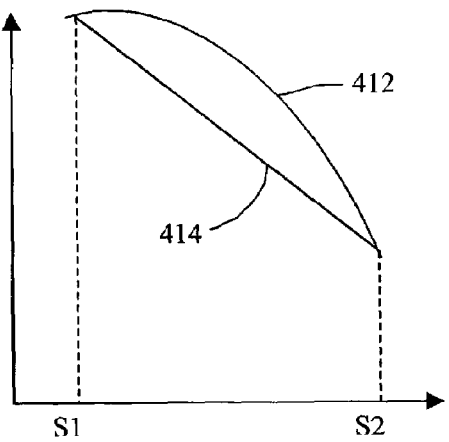
FIG. 4C is a graphical representation of comparative plot of an actual color value versus position against a linear interpolation of the color value versus position.

Exemplary superposed plots for a "color value" is illustrated in FIG. 4c, including the plot for the actual color 412 and the linearly interpolated color 414. This plot could be for Y, Cb, or Cr. For simplicity in this example, only one color variable is considered, but understand that preferably the comparison of actual and interpolated color are done for all of the components, including Y, Cb, and Cr simultaneously.

Figure 4D:
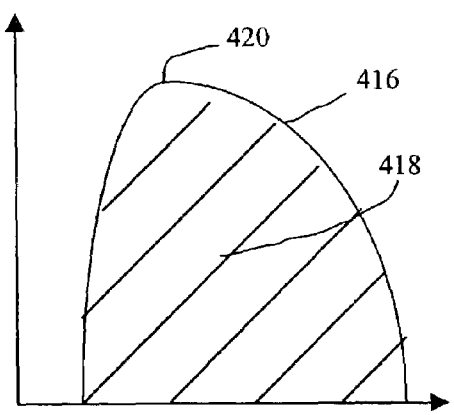
FIG. 4D is a graphical representation of an interpolative error function versus position for a linear interpolation of a color value.

As depicted in FIG. 4D, the actual value "plotted" would be an interpolative error function 416 versus position. The interpolative error function is the degree to which the actual color at a point differs from the linearly interpolated color at that point. In an exemplary embodiment, this is just the value DC, or "color difference", defined above, where:

DC="Color Difference" between interpolated color and actual color from 4b-1 at a point
DY=Difference between interpolated value of Y and value of Y from 4b-1
Same definitions for Cb, Cr.

Now according to step 308 the interpolative error of the linear interpolation is calculated. In an exemplary embodiment, this is defined roughly as the area 418 under the interpolative error function curve 416, and can be estimated as follows:

Interpolative Error=DC times length of segment between S1 and S2 divided by two.

Note that the interpolative error function is based upon a visible limit function which describes the visibility of the error.

According to step 308, this error is compared to the error threshold (from step 300). If the interpolative error (defined by area 418) is above the error threshold, then a contour is generated according to step 310.

Figure 4E:
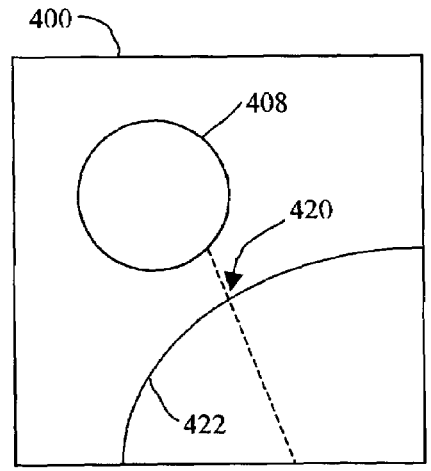
FIG. 4E is the plot 4B-1 with a color contour 422 added.

According to the method of the present invention, one point on the contour (to be generated) is the point associated with the maximum error 420. The color value associated with the contour is the color at point 420. This point 420 is also depicted in FIG. 4e. The next step is to find "connecting" points that have substantially the same color value as point 420. This is done in two directions to generate a substantially constant color contour 422.

Finding new points is done by scanning pixels (from the original pixel based data set) in the vicinity of point 420 to see which ones match the color value of point 420 (to within a tolerance). In most cases, the color value will not exactly match 420 on any one pixel. This can be resolved by interpolating between pixels. Hence, the resultant contour points may not fall exactly on pixels, but may fall between pairs of pixels based on a weighted average color that matches the color of point 420.

For example, consider FIG. 4f, wherein the point 420 is a pixel location as surrounded by 8 neighboring pixels. Pixels 424, 426, 428, and 430 are the neighboring pixels closest in color to point 420. Thus, a new point on contour 422 will fall between pixels 424 and 426, with an exact location depending on which pixel has a color closer to that of 420. In this interpolative manner, two new points on the contour 422 are then found. This process is continued for each of the new points, until all of the points on contour 422 are found. Contour 422 may end at the edge of edge 400 of the contour map or when no more points can be found that are the same color as 420 within a specified tolerance.

Once a new contour has been added, steps 304–308 of FIG. 4A are repeated. When an error is found to be less than the visible error threshold in step 308, then the test in step 312 is invoked to determine if there are any untested segments left. If so, then the process of steps 304 to 308 or 310 continues until "all segments" have been tested to be below the error threshold. It is understood that "all segments" refers to the testing that has been done to a density (such as partial or full pixel density) to assure that the color accuracy level defined by the error threshold has been met. When all segments have been tested according to step 312, the present invention moves to step 314 wherein the requirements of process 102 (of FIG. 2) have been met.

Before going to on to the process 104 of FIG. 5, some discussion about possible variations for FIG. 4A is appropriate. Where the present invention is described as working with Y, Cb, and Cr as the color coordinates, the process will also work reasonably well with coordinates RGB, CMY, LAB, or any other coordinate system. There are also other ways of carrying out this process.

For example, following step 300, the present invention could start by defining the border 400 in the new data structure consistent with step 302. Next, according to steps 304–308, for each row (or column) of pixels (starting with row 1, column 1, or a middle row or column, for example), the error plot like that in FIG. 4D can be generated. This differs from the earlier discussion where the error function was generated perpendicular to the tangent to a contour. According to step 310, a contour can be generated from the point of maximum error for the error function. This alternative embodiment for the process of FIG. 4A may yield contours in different locations, but still embodies the method of the present invention.

In addition to contours of substantially constant color, it may be advantageous to identify contours that are on edges of physical objects (being depicted in an image) or contours that represent minima or maxima in terms of color parameters such as Y. These contours are likely to be used along with contours of substantially constant color as per the methods described with respect to FIG. 4A.

At this point, some further compression and improvement in the data takes place according to FIG. 5A which depicts a preferred embodiment of process 104 of FIG. 2. At this point, the present invention has contours formed by points defined by the a data structure according to step 500. The point spacing along contours is approximately the same as the pixel based data structure as a result of the processes of finding the constant color contours on a pixel by pixel basis. To provide a more efficient data structure, curves or splines are fit to each of the contours according to 502. The curves are generally first, second, or third order in x and/or y, depending on what fits the best and what minimizes the required data. Next, control points are stored as a final data structure according to step 504. In one exemplary embodiment, cross connects between the curves are defined in the data structure according to step 506.

Steps 500–504 of FIG. 5A are depicted with respect to FIG. 5B. A set of points 600 define a portion of a contour. A cubic spline 602 is fitted through the points. The cubic spline is stored in a final data structure as control points 604. For the entire contour map, all of the contours are replaced with a combination of linear, quadratic, and cubic functional representations or splines, depending on what fits best.

Figure 5C:
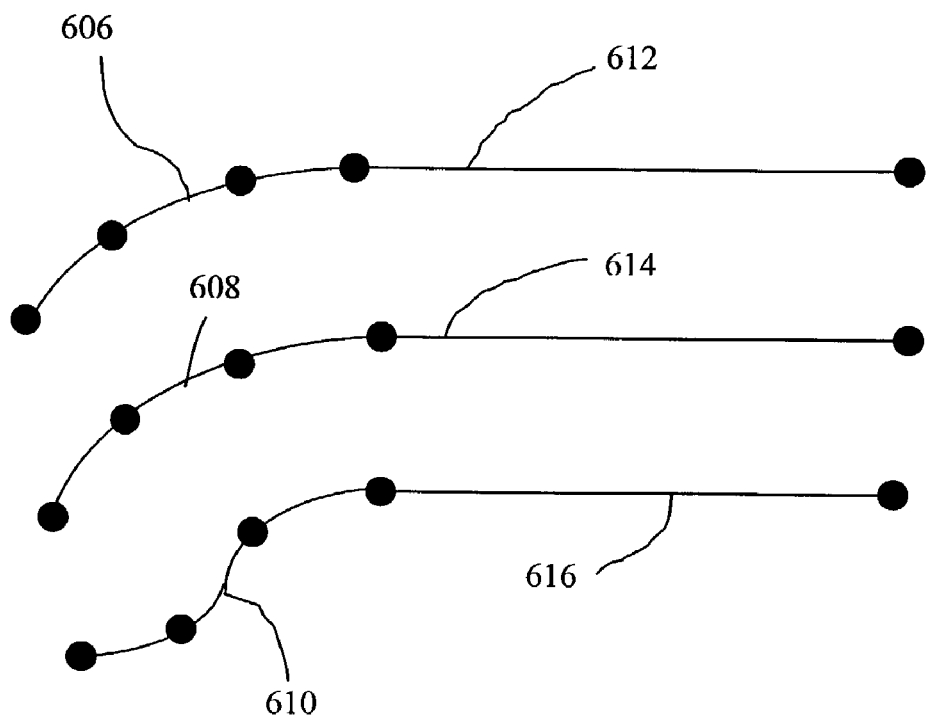
FIG. 5C is a graphical representation of several splines that have been curve fitted to contours.

FIG. 5C is an exemplary set of contours defined by the points that are stored in the more efficient contour map data structure. Segments 606, 608, and 610 are each defined by four points, since a cubic spline best fits those contours. On the other hand, segments 612, 614, and 616 are each defined by two points, since they are linear. Remember that in this example, each point is actually stored in the new data structure as at least a five dimensional point: x, y, Y, Cb, Cr. The contour defined by 606 and 612 is of a substantially constant color to within a predetermined tolerance. The contour defined by 608 and 614 is of a different but substantially constant color. The contours are close enough together by virtue of the method of FIG. 4a such that a linear interpolation between the contours results in a visual error below a predetermined visual threshold.

Figure 5D:
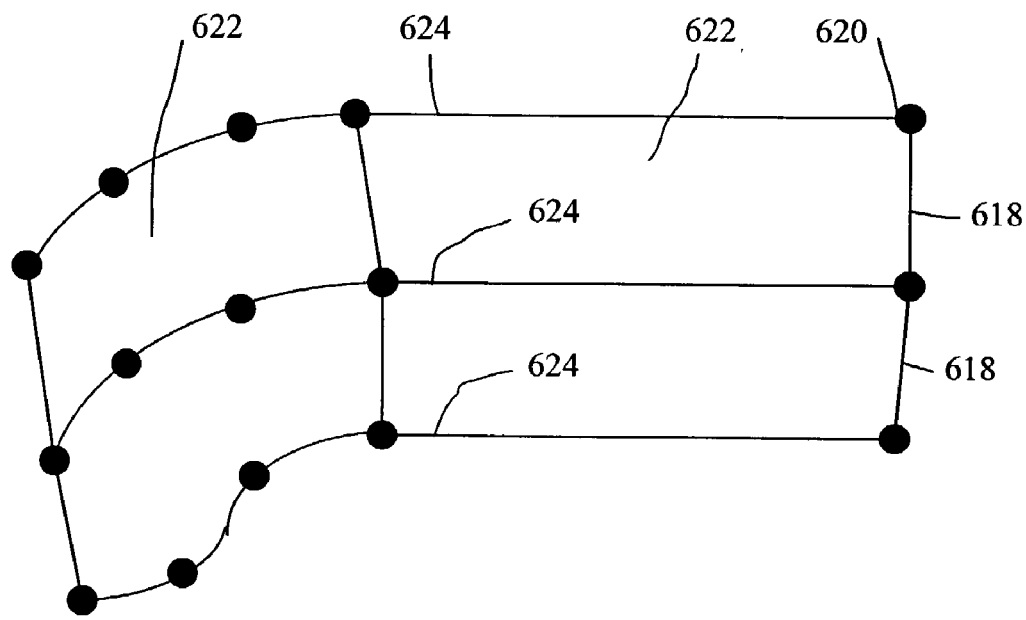
FIG. 5D is a graphical representation of some primitives defined by contours and cross connects.

As depicted by FIG. 5D, the data structure optionally defines cross-connects 618 between end points 620 of each spline. The cross connects close off "G-Patches" or primitives 622 of the area defined by the constant color contours and are particularly important for 3D surface simulation applications of the method of the present invention. The contours are also important for the rendering process.

FIG. 6A depicts a rendering process that utilizes the data structure of the present invention. According to step 700, the data structure defines a plurality of contours. The contours are defined by a plurality of control points. As an optional process 702, additional points can be added to the contour curves to improve the ultimate rendering resolution. Finally, according to 704, point data for the curve defining points and (optional) the additional points is sent to the video processor electronics. In an exemplary embodiment, the processor electronics generates triangles on display 10.

Figure 6B:
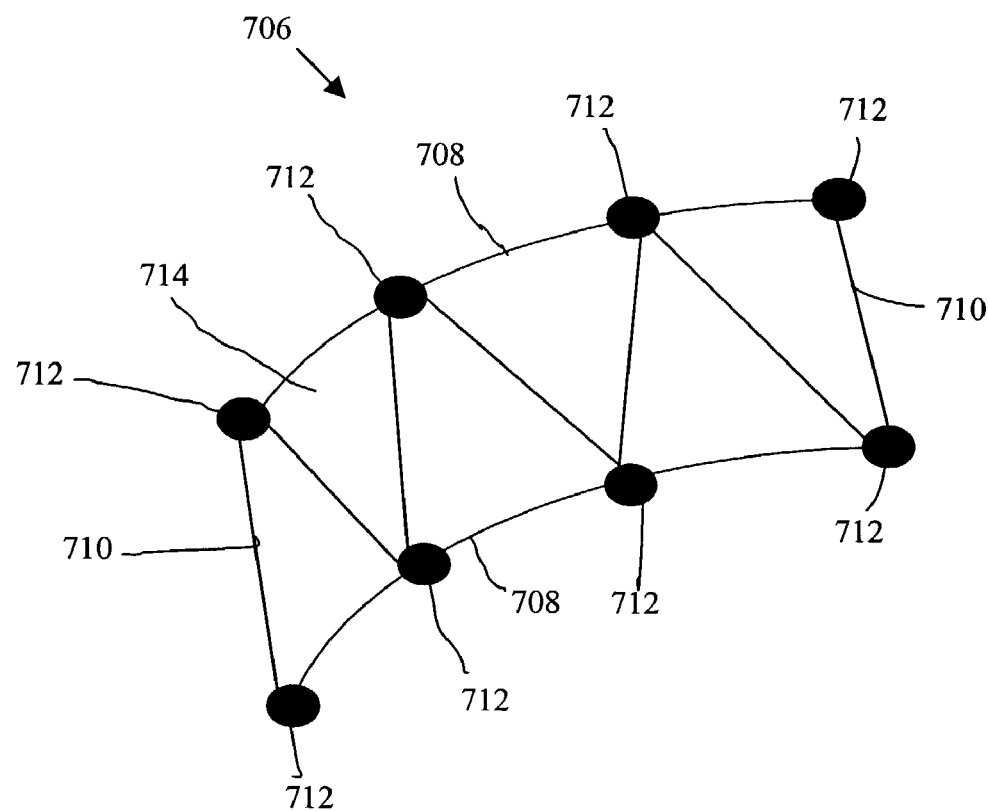
FIG. 6B is a graphical representation of a single primitive being divided into triangles.
Figure 6C:
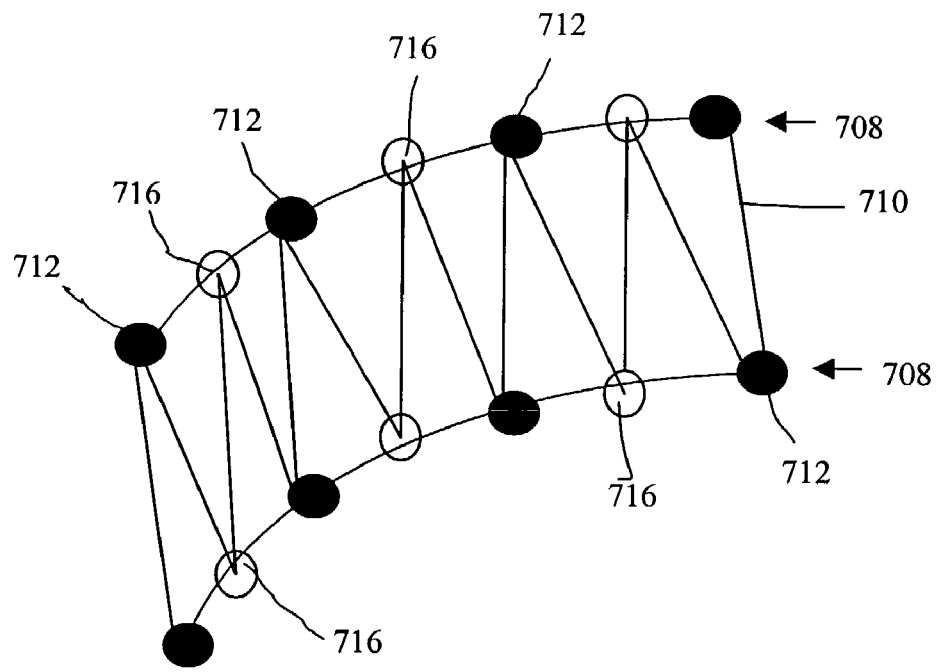
FIG. 6C is a graphical representation the primitive from FIG. 6B being divided into triangles to a higher resolution than for FIG. 6B.

This rendering process is further described with respect to FIGS. 6B and 6C. FIG. 6B depicts a single primitive or G-patch 706 enclosed by two contour segments 708 and two cross connects 710. Curves fitted to the contour segments are each defined by four control points 712 for each curve segment 708. Thus, each contour segment 708 is a cubic spline 708. When the points 712 are sent to the video processor electronics 8, the video processor electronics 8 generate triangles 714 on display 10. Each triangle displays color that is linearly interpolated between the vertices of the triangle. The color for each triangle vertex is, of course, the color of the contour upon which that vertex falls.

In some cases, such as when a user zooms in on an image, visual artifacts may become present with this triangle generation process. To reduce or eliminate this artifact, as depicted in FIG. 6C, additional points 716 are added to splines 708 to allow the display 10 to more smoothly display the edges of the curves 708. In this method, the number of points along each edge of the G-Patch varies by a complexity number N times the square root of the scale factor. These points are then interconnected to form triangles. This minimizes drawing time (minimum number of triangles) and optimizes visual quality. This compact primitive can be realized in a VLSI (very large scale integration) device and would result in a ten fold (or more) improvement in speed by reducing the amount of data sent to the video processor electronics to less than $1/10^{th}$ the data size required by the older pixel based system.

The present invention represents a substantial advance in the technology of image compression for 2D and 3D images. By representing color data as constant color contours rather than individual pixels, the storage and processing requirements for an image are greatly reduced. Further compression occurs by the use of control points to represent these contours. However, by utilizing compression methods that keep errors below the visual limit, the qualities of the original image are protected. Further, by allowing the addition of points to each spline, zoomed images can be even of higher quality than zooming the original pixel data.

Pixel data representations of an image contain a lot of information that a human eye cannot perceive. Storing this information for the purpose of generating images adds no value. With the method of the present invention, to a much greater extent only information perceivable by the human vision system is stored in a data structure.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A method of transmuting (i) image data, meaning data representing an image, in the form of pixels having both positional point coordinates and color values, into (ii) another form of data representing the same image, for purposes including image display, the method comprising:

from the image data, defining contour data representing the image in terms of points on contours connecting multiple points each of which points has the same color value to within a predetermined tolerance, the total number of different contours being determined as the minimum required to provide an interpolated fit between contours that will keep error in any visual representation of the image from the contour data below a predetermined threshold error; and displaying the image from the contour data;

wherein by action of the defining the image data in the form of pixels is transmuted into a new from of data, called contour data, having the form of contours each of which connects multiple points having the same color value to within the predetermined tolerance;

wherein insofar as some image points of identical color values need not both appear on any contours, then the contour data is first-abbreviated, or first-compressed, from the image data from which it is derived.

2. The method according to claim 1
wherein the predetermined tolerance to which the contours aggregating the contour data are defined is of such magnitude as permits that at least some contours will be defined surrounding one or more points having the same color value to within the predetermined tolerance; and wherein insofar as surrounded points need not be, and are not, included within the contour data, then the contour data is further second-abbreviated, or second-compressed, from the image data from which it is derived.

3. The method according to claim 2 further comprising:
fitting curves, or splines, along the contours in order that the number of points required to represent the contours is reduced;

wherein by this fitting of splines of reduced number of points, the contour data is yet further third-abbreviated, or third-compressed, from the image data from which it is derived.

4. The method according to claim 3 further comprising:
defining the fitted curves, or splines, in terms of a reduced number of points, called control points, along the lengths thereof;

wherein by defining of the fitted curves, or splines, in terms of a further reduced number of control points, the contour data is yet further fourth-abbreviated, or fourth-compressed, from the image data from which it is derived;

wherein the contour data is in reduced from the pixel data from which it is derived nonetheless to representing the same image.

5. The method according to claim 1
wherein the predetermined threshold error, to which threshold error any error in any visual representation of the image from the contour data will be below, is set in consideration of human perception in detecting error in a visual image reconstituted from the contour data.

6. The method according to claim 1
wherein the defining transpires in a computer;
wherein the displaying transpires within an image processor remote from the computer;
wherein, between the defining and the displaying, the contour data is of necessity communicated from the computer to the remote image processor;
wherein, because the contour data is compressed, bandwidth in communication from the computer to the remote image processor is conserved.

7. A method of compressing an initial data structure, wherein the initial data structure defines an image as an array of pixel elements, the method comprising:

providing an error threshold;
generating a new data structure defining a plurality of contours, wherein for at least some of the contours each contour has a color value that is constant to within a tolerance; and
adding information to the new data structure that defines additional contours until an interpolative error between the contours is below the error threshold.

8. The method of claim 7, wherein the error threshold is an error that is based upon the visible limit of observing the interpolative error.

9. The method of claim 7, wherein generating the new data structure includes defining contours that at least partially surround regions of a substantially constant color value.

10. The method of claim 7, further comprising eliminating anomalous pixel data from the initial data structure prior to generating the new data structure.

11. The method of claim 7, further comprising calculating an interpolation of the color between two contours and wherein the interpolative error is an error associated with the difference between the original color versus position between the two boundaries and the interpolation of the color.

12. The method of claim 11, wherein the interpolation is selected to be compatible with a video processing system.

13. The method of claim 7, wherein the new data structure defines each contour as a plurality of connected curves.

14. The method of claim 13, wherein the new data structure defines each curve as a plurality of control points.

15. The method of claim 13, wherein the new data structure defines endpoints for each of the curves.

16. The method of claim 15, wherein the new data structure defines cross-connects that couple endpoints of curves together to define primitives.

17. The method of claim 7, wherein at least some of the contours define maxima or minima for the color values within a region of the image having high rates of color change.

18. The method of claim 7, wherein having a color value constant to within a tolerance is keeping a color difference below a color difference tolerance.

19. The method of claim 7, wherein the color difference is the root mean weighted square difference of three color components.

20. A method of compressing a first data structure wherein the initial data structure defines an image as an array of pixel elements, the method comprising:

generating a second data structure defining a plurality of contours wherein generating the data structure for each of at least some of the plurality of contours includes:
identifying individual points along the contour, the points having a color value that is constant to within a tolerance;
fitting at least one curve to the contour; and
storing control points that define the at least one curve.

21. The method of claim 20, wherein the individual points are found by carrying out a color interpolation between pixels of the first data structure.

22. The method of claim 20, wherein the number of curve defining points is substantially less than the number of individual points.

23. The method of claim 20, wherein the number of curve defining points are the minimum number of points required to specify at least one curve.

24. The method of claim 20, wherein the at least one curve includes a plurality of curves connected end to end, with one of the curve defining points at each end of each curve.

25. The method of claim 20, wherein the at least one curve includes a plurality of curves connected end to end, wherein each curve is either linear, quadratic, or higher order.

26. The method of claim 20, wherein generating the data structure for each of at least some of the contours includes:
identifying individual points along the contour, the points having a color value that is minimized or maximized;
fitting at least one curve to the contour; and
storing control points that define the at least one curve.

27. A method of compressing a first data structure wherein the initial data structure defines an image having both positional point coordinates and color values as an array of pixel elements, the method comprising:
first generating a new data structure that defines from the initial data structure a plurality of primitives, each of at least some of the primitives bounded by a plurality of contour curves connecting multiple points each of which points has the same color value to within a predetermined tolerance, the total number of different contour curves being determined as the minimum required to provide an interpolated fit between curves that will keep error in any visual representation of the image from the new data structure below a predetermined threshold error,
second generating at least one cross connect that couples one contour curve to another contour curve.

28. The method of claim 27, wherein the first generating is of a contour curve that is a linear or higher order curve.

29. The method of claim 27, wherein the second generating is of a cross connect that is a linear curve.

30. The method of claim 27, wherein at least one primitive is defined by two contour curves on two opposing sides and two cross connects that each couple the two contour curves.

31. The method of claim 27, wherein the data structure defines two curve defining points for each cross connect, wherein each of the two curve defining points is also a curve defining point for a contour.

32. A computer program stored in a computer-readable medium, for processing a data structure representing an image, in the form of pixels having both positional point coordinates and color values
wherein the collective pixels define a plurality of contours wherein the contours define some regions of substantially constant color and some regions of varying color; and
wherein the number of contours are determined as the minimum required to provide an interpolated fit between contours that will keep error in any visual representation of the image from the pixel data below a predetermined threshold error.

33. The data structure of claim 32, wherein at least one region of varying color is defined by two adjacent contours wherein a color difference between the contours is selected to reduce an interpolative color error between the contours to below an error threshold.

34. The data structure of claim 32, wherein the contours are selected based on an interpolative function and wherein the interpolative function is selected to optimize performance with a video processing system.

35. The data structure of claim 32, wherein at least some of the contours define maxima or minima for the color values within a region of the image having high rates of color change.

36. The data structure of claim 32, wherein at least some of the contours are contours having a substantially constant color value.

37. The data structure of claim 32, wherein the contours are selected based on an interpolative function and wherein the interpolative function is selected to minimize transmission time over a network connection.

38. The data structure of claim 32, wherein the contours are selected based on an interpolative function and wherein the interpolative function is selected to minimize data structure file size.

39. A method of generating an image comprising:
providing a data structure defining a plurality of contours wherein the contours define some regions of substantially constant color and some regions of varying color, the total number of different contours being determined as the minimum required to provide an interpolated fit between contours that will keen error in any visual representation of the image from the data structure below a predetermined threshold error; and
defining connections between the contours to form polygons.

40. The data structure of claim 39, wherein at least one region of varying color is defined by two adjacent contours wherein a color difference between the contours is selected to reduce an interpolative color error between the contours to below an error threshold.

41. The data structure of claim 39, wherein the contours are selected based on an interpolative function and wherein the interpolative function is selected to optimize performance with a video processing system.

42. The method of claim 39, wherein at least some of the contours define maxima or minima for the color values within a region of the image having high rates of color change.

43. The method of claim 39, wherein at least some of the contours are contours having a substantially constant color value.

44. The data structure of claim 39, wherein the contours are selected based on an interpolative function and wherein the interpolative function is selected to minimize transmission time over a network connection.

45. The data structure of claim 39, wherein the contours are selected based on an interpolative function and wherein the interpolative function is selected to minimize data structure file size.

46. A method of generating an image comprising:
providing a data structure having points with the same color value within a predetermined tolerance, the points defining a plurality of contours wherein the contours define some regions of substantially constant color and some regions of varying color, and wherein the total number of different contours are determined as the minimum required to provide an interpolated fit between contours that will keep error in any visual representation of the image from the contour data below a predetermined threshold error; and adding or removing points from the data structure based on an image magnification factor.

47. The method of claim 46, wherein the contours and points are selected to optimize performance with a video processing system.

48. The method of claim 46, wherein at least some of the contours define maxima or minima for the color values within a region of the image having high rates of color change.

49. The method of claim 46, wherein at least some of the contours are contours having a substantially constant color value.

* * * * *